(12) United States Patent
Kim

(10) Patent No.: US 10,196,973 B2
(45) Date of Patent: Feb. 5, 2019

(54) VARIABLE COMPRESSION RATIO DEVICE

(71) Applicant: Hyundai Motor Company, Seoul (KR)

(72) Inventor: Won Gyu Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 385 days.

(21) Appl. No.: 15/267,851

(22) Filed: Sep. 16, 2016

(65) Prior Publication Data

US 2017/0268419 A1 Sep. 21, 2017

(30) Foreign Application Priority Data

Mar. 16, 2016 (KR) ........................ 10-2016-0031706

(51) Int. Cl.
| | |
|---|---|
| *F02D 15/02* | (2006.01) |
| *F02B 75/04* | (2006.01) |
| *F16C 7/06* | (2006.01) |
| *F16J 1/16* | (2006.01) |

(52) U.S. Cl.
CPC ............ *F02B 75/04* (2013.01); *F02B 75/045* (2013.01); *F02D 15/02* (2013.01); *F16C 7/06* (2013.01); *F16J 1/16* (2013.01)

(58) Field of Classification Search
CPC ...... F02B 75/04; F02B 75/044; F02B 75/045; F16C 7/06; F16J 1/16; F02D 15/02
See application file for complete search history.

(56) References Cited

FOREIGN PATENT DOCUMENTS

| JP | H03-242434 A | 10/1991 | |
|---|---|---|---|
| JP | 2009-108864 A | 5/2009 | |
| KR | 10-2010-0062721 A | 9/2010 | |
| KR | 10-2011-0037392 A | 4/2011 | |
| WO | WO 2016014312 A1 * | 1/2016 | ............... F16C 7/06 |

* cited by examiner

*Primary Examiner* — Logan Kraft
(74) *Attorney, Agent, or Firm* — Brinks Gilson & Lione

(57) ABSTRACT

The present disclosure provides a variable compression ratio device including a piston, a piston pin, an eccentric cam, a connecting rod, a crank pin, a hydraulic pump, an oil jet injection nozzle, an oil jet control valve, and a control unit. In addition, a groove formed in a rotating direction of the eccentric cam is divided into a first chamber and a second chamber. The piston pin receives a hydraulic pressure through a path formed inside the crank pin and the connecting rod and receives the oil injected from the oil jet injection nozzle to control the hydraulic pressure supplied to the first chamber and the second chamber of the eccentric cam, thereby controlling the rotation position of the eccentric cam.

11 Claims, 6 Drawing Sheets

VARIABLE COMPRESSION RATIO DEVICE

CROSS-REFERENCE TO RELATED APPLICATION

This application claims priority to and the benefit of Korean Patent Application No. 10-2016-0031706 filed on Mar. 16, 2016, the entire contents of which are incorporated herein by reference.

FIELD

The present disclosure relates to an internal combustion engine, and more particularly to a variable compression ratio device for improving fuel efficiency by varying a compression ratio in a combustion chamber of the internal combustion engine depending on a driving condition of the engine.

BACKGROUND

The statements in this section merely provide background information related to the present disclosure and may not constitute prior art.

In general, the thermal efficiency of heat engines increases when the compression ratio is high, and in spark ignition engines, the thermal efficiency increases when the ignition timing is advanced up to a predetermined level.

However, when the ignition timing is advanced with a high compression ratio in the spark ignition engines, abnormal combustion is generated and the engines may be damaged, so that there is a limit in advance of the ignition timing and accordingly the output is necessarily reduced.

A VCR (Variable Compression Ratio) apparatus is an apparatus that changes the compression ratio of a gas mixture in accordance with the operation state of an engine.

According to a variable compression ratio engine that varies the compression ratio, it improves the fuel efficiency by increasing the compression ratio of a gas mixture under a low load condition and prevents knocking and improves the output by reducing the compression ratio of the gas mixture under a high load condition.

In a case of the current diesel engine, to meet the enhanced exhaust gas regulations, the low temperature combustion is realized by reducing the compression ratio through the large volume of the piston combustion chamber, since the cold start performance is deteriorated depending on the compression ratio reduction, a glow system is manufactured of a ceramic material to enhance a rigidity thereof and a separate control unit controlling the glow system is added such that a manufacturing cost is increased.

Accordingly, research for a new structure realizing the variable compression ratio by controlling the position of the piston through a relatively simple structure has been undertaken, and a structure raising or lowering the piston by rotating an eccentric cam through a hydraulic pressure has been developed, however the hydraulic line for forward rotating or backward rotating the eccentric cam is respectively formed such that the structure thereof is complicated.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a variable compression ratio device reducing the fuel consumption and improving the output by varying the compression ratio of the gas mixture depending on the operation condition of the engine with the relatively simple structure.

A compression ratio device according to one form of the present disclosure includes a connecting rod having a first end part connected with a piston and a second end part connected with a crankshaft; the piston connected to the connecting rod by a piston pin, and the piston pin formed with a plunger space in a longitudinal direction therein; an eccentric cam disposed between an exterior circumference of the piston pin and an interior circumference of the connecting rod and forming a groove between the piston pin and the connecting rod; a stopper disposed inside the groove and fixed to one of the interior circumference of the connecting rod and the eccentric cam to divide the groove into a first chamber and a second chamber; a plunger disposed to be reciprocally moved in the plunger space to selectively supply a hydraulic pressure through the connecting rod to one of the first chamber and the second chamber; a return member disposed at a first end of the plunger space and supporting the plunger in a second end of the plunger space to supply the hydraulic pressure through the connecting rod to the second chamber; and an oil jet injection nozzle disposed under the piston to selectively inject oil to a piston side, wherein the oil injected from the oil jet injection nozzle is transmitted to the second end of the plunger space through a guide path formed inside the piston and an oil jet path formed in the piston pin such that the plunger is moved toward the first end of the plunger space and the hydraulic pressure through the connecting rod is supplied to the first chamber.

If the oil is not injected from the oil jet injection nozzle, the plunger may be moved by the return member toward the second end of the plunger space, and the hydraulic pressure supplied through the connecting rod is supplied to the second chamber.

If the hydraulic pressure is supplied to the first chamber, a rotation position of the eccentric cam may be controlled such that the piston is farther from the crankshaft, thereby realizing a high compression ratio.

If the hydraulic pressure is supplied to the second chamber, a rotation position of the eccentric cam may be controlled such that the piston is closer to the crankshaft, thereby realizing a low compression ratio.

A first check space may be formed inside a first end of the plunger, a second check space may be formed inside a second end part of the plunger, a check space connection path connecting the first check space and the second check space may be formed inside the plunger, an exterior circumference of the plunger at the first end and second end of the plunger is in contact with an interior circumference of the plunger space, a smaller diameter part may be formed at a center of a longitudinal direction of the plunger with the connection path spaced apart from the interior circumference of the plunger space by a predetermined interval, an open path leading from the check space connection path to outside of the smaller diameter part of the plunger, a first check path leading from the first check space to the outside may be formed at the plunger, a second check path leading from the second check space to outside of the plunger may be formed in the plunger, a space formed by the smaller diameter part is always fluidly connected with a main supply path formed through the plunger for receiving a hydraulic pressure from the connecting rod, in a state that the plunger is moved toward the second end of the plunger space by the return member, a first chamber connection path formed through the piston pin from the interior circumference of the plunger space to outside of the piston pin connects the first check path with the first chamber, in a state that the plunger is moved toward the first end of the plunger space by the hydraulic pressure injected from the oil jet injection nozzle, a second chamber connection path formed through the piston pin from the interior circumference of the plunger space to outside of the piston pin connects the second check path with the second chamber.

A first check valve disposed at the first check space and preventing the hydraulic pressure from being transmitted from the first check space to the check space connection path; and a second check valve disposed at the second check space and preventing the hydraulic pressure from being transmitted from the second check space to the check space connection path may be further included.

An oil jet control valve controls the oil injected from the oil jet injection nozzle; and a control unit controls the oil jet control valve depending on an operation condition may be included.

A vent hole extends through the piston pin from a first end of the plunger space near the return member to outside of the piston pin to reduce the inner hydraulic pressure.

A crank pin connecting the crankshaft and the connecting rod, and a hydraulic pump transmitting the hydraulic pressure to the main supply path through the connecting rod may be further included.

The first and second check valves may include a ball and an elastic member supporting the ball.

A pocket is formed at a lower edge of the piston to receive the oil jet injected from the oil jet injection nozzle, and the hydraulic pressure may be transmitted to the guide path through the pocket.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
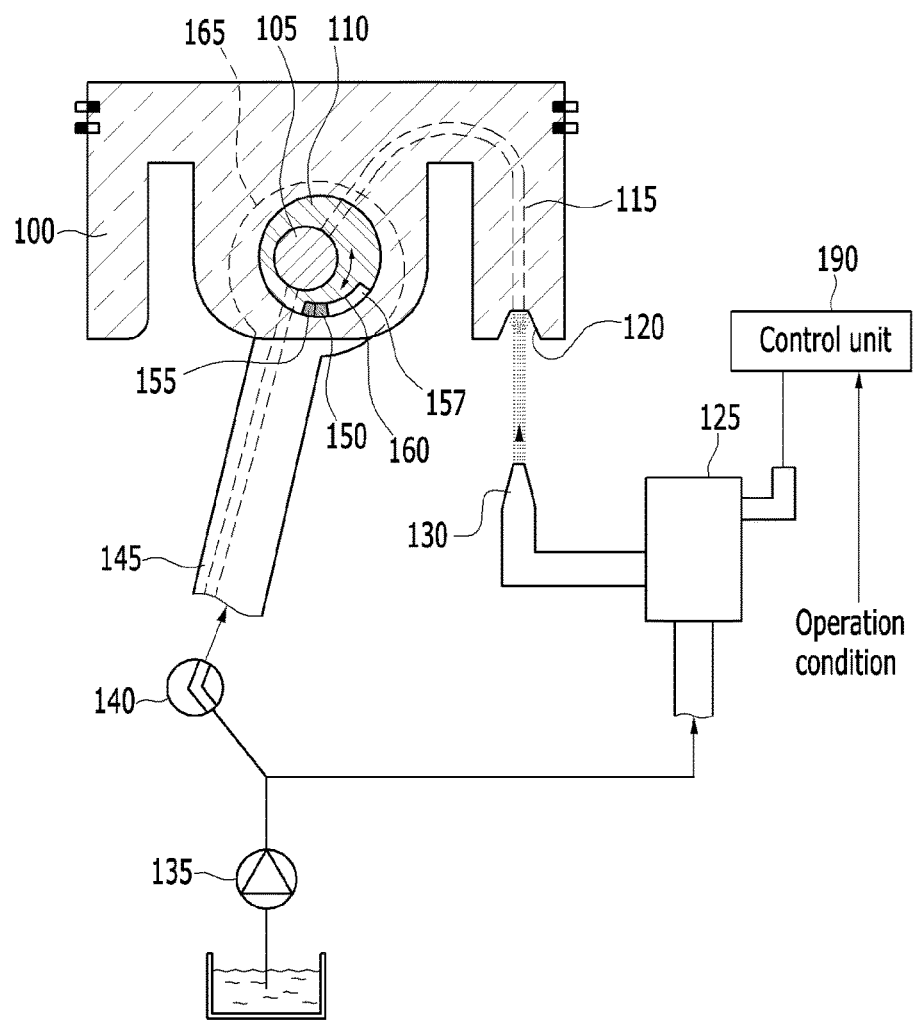
FIG. 1 is a schematic diagram of a variable compression ratio device according to one form of the present disclosure.

The drawings described herein are for illustration purposes only and are not intended to limit the scope of the present disclosure in any way.

DESCRIPTION OF SYMBOLS

100: piston 105: piston pin
110: eccentric cam 115: guide path
120: pocket 125: oil jet control valve
130: oil jet injection nozzle 135: hydraulic pump
140: crank pin 145: connecting rod
150: stopper 155: first chamber
157: second chamber 160: groove
165: small end part 190: control unit
200: first check path 205: first chamber connection path
210: main supply path 212: plunger space
215: open path 220: second chamber connection path
225: second check path 230: oil jet path
235: second check space 240: second check valve
245: check space connection path 250: first check valve
252: smaller diameter part 255: plunger
260: first check space 265: return member
270: vent hole

DETAILED DESCRIPTION

The following description is merely exemplary in nature and is not intended to limit the present disclosure, application, or uses. It should be understood that throughout the drawings, corresponding reference numerals indicate like or corresponding parts and features.

However, the size and thickness of each component illustrated in the drawings are arbitrarily shown for ease of description and the present disclosure is not limited thereto, and the thicknesses of portions and regions are exaggerated for clarity.

In addition, parts that are irrelevant to the description are omitted to clearly describe the forms of the present disclosure, and like reference numerals designate like elements throughout the specification In the following description, designation of components as a first, a second, and the like is to differentiate components having the same name and therefore an order thereof is not necessarily limited thereto.

FIG. 1 is a schematic diagram of a variable compression ratio device according to one form of the present disclosure.

Referring to FIG. 1, a variable compression ratio device includes a piston 100, a piston pin 105, an eccentric cam 110, a connecting rod 145, a crank pin 140, a hydraulic pump 135, an oil jet injection nozzle 130, an oil jet control valve 125, and a control unit 190.

A small end part 165 is formed at an upper part of the connecting rod 145, a pocket 120 is formed at a lower part edge of the piston 100, and a guide path 115 is formed from the pocket 120 to the piston pin 105 inside the piston 100.

In addition, a groove 160 is formed in a rotating direction of the eccentric cam 110 at an exterior circumference of the eccentric cam 110, and a stopper 150 dividing the groove 160 into a first chamber 155 and a second chamber 157 is fixed to an interior circumference of the small end part 165.

The small end part 165 is formed at the upper part of the connecting rod 145, a big end part (not shown) is connected to a crankshaft (not shown) through the crank pin 140, and the piston pin 105 penetrates a lower center pat of the piston 100 and the small end part 165 of the connecting rod 145 in a horizontal direction to connect the piston 100 and the connecting rod 145.

Also, the piston pin 105 receives a hydraulic pressure through a path formed inside the crank pin 140 and the connecting rod 145 and receives the oil injected from the oil jet injection nozzle 130 through the guide path 115 to control the hydraulic pressure such that the hydraulic pressure supplied to the first chamber 155 and the second chamber 157 of the eccentric cam 110 is controlled, thereby controlling the rotation position of the eccentric cam 110.

In one form of the present disclosure, the hydraulic pressure is supplied to the first chamber 155 by the hydraulic pressure control of the piston pin 105, if the hydraulic pressure of the second chamber 157 is eliminated, the eccentric cam 110 is rotated in a counterclockwise direction, the eccentric cam 110 lifts the piston pin 105 and the piston 100 upward, thereby realizing a high compression ratio.

In addition, the hydraulic pressure is supplied to the second chamber 157 by the hydraulic pressure control of the piston pin 105, if the hydraulic pressure of the first chamber 155 is eliminated, the eccentric cam 110 is rotated in the clockwise direction such that the eccentric cam 110 moves the piston pin 105 and the piston 100 downward, thereby realizing the low compression ratio.

In one form of the present disclosure, the control unit 190 controls the oil jet control valve 125 depending on the operation condition to control the oil jet injected from the oil jet injection nozzle 130 such that the rotation position of the eccentric cam 110 is controlled, thereby realizing the high compression ratio or the low compression ratio.

Also, in another form of the present disclosure, the groove 160 may be formed at an interior circumference of the connecting rod, and the stopper 150 may be fixed to the exterior circumference of the eccentric cam 110.

Figure 2:
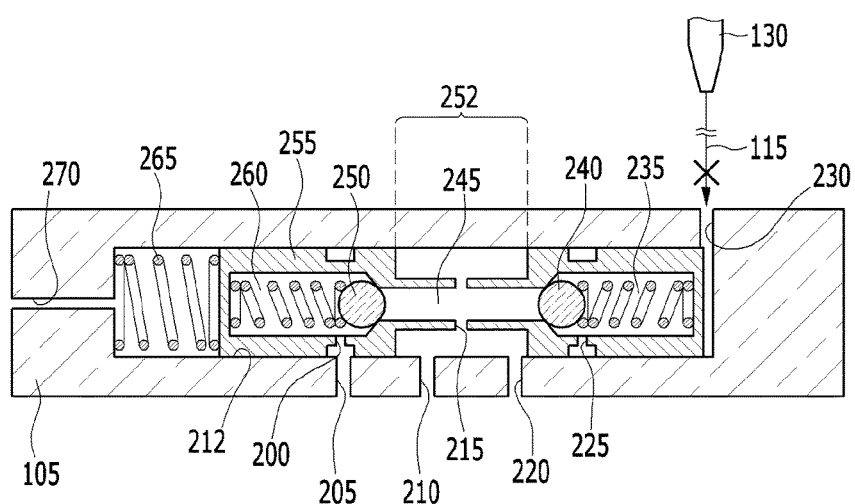
FIG. 2 is a cross-sectional view showing a structure of a piston pin in a variable compression ratio device according to one form of the present disclosure.

FIG. 2 is a cross-sectional view showing a structure of a piston pin in a variable compression ratio device according to an exemplary form of the present disclosure.

Referring to FIG. 2, a plunger space 212 is formed in a longitudinal direction inside the piston pin 105, a vent hole 270 leading from one end part of the plunger space 212 to the outside is formed, and an oil jet path 230 leading from the other end part of the plunger space 212 to the outside.

A plunger 255 is disposed inside the plunger space 212 to be reciprocally moved, and a return member 265 elastically supporting the plunger 255 in the second end part direction is disposed at a first end part of the plunger space 212.

In addition, a main supply path 210 leading from the center of the longitudinal direction of the plunger space 212 to the outside is formed at the piston pin 105, and a first chamber connection path 205 and a second chamber connection path 220 are formed with a predetermined interval from the main supply path 210.

The plunger 255 has a structure that entirely slides with the interior circumference of the piston pin 10, a smaller diameter part 252 is formed at the center of the longitudinal direction, and the space formed by the smaller diameter part 252 is always connected with the main supply path 210 to receive the hydraulic pressure.

In addition, a first check space 260 is formed at an inner first end part of the plunger 255, a second check space 235 is formed at an inner second end part, and a check space connection path 245 connecting the first check space 260 and the second check space 235 is formed. Here, the smaller diameter part 252 is formed corresponding to the check space connection path 245.

A first check path 200 leading from the first check space 260 of the plunger 255 to the outside, a second check path 225 leading from the second check space 235 to the outside is formed, and an open path 215 leading from the check space connection path 245 to the outside of the smaller diameter part 252 is formed.

Also, a first check valve 250 is disposed at the first check space 260, the first check valve 250 restricts the oil to be moved from the first check space 260 to the check space connection path 245, a second check valve 240 is disposed at the second check space 235, and the second check valve 240 restricts the oil to be moved from the second check space 235 to the check space connection path 245.

In one form of the present disclosure, in the state that the plunger 255 is moved into the second end part (a right side) by the return member 265, the first chamber connection path 205 and the first check path 200 are connected, and the second chamber connection path 220 is connected to the main supply path 210 through the smaller diameter part 252.

Figure 3A:
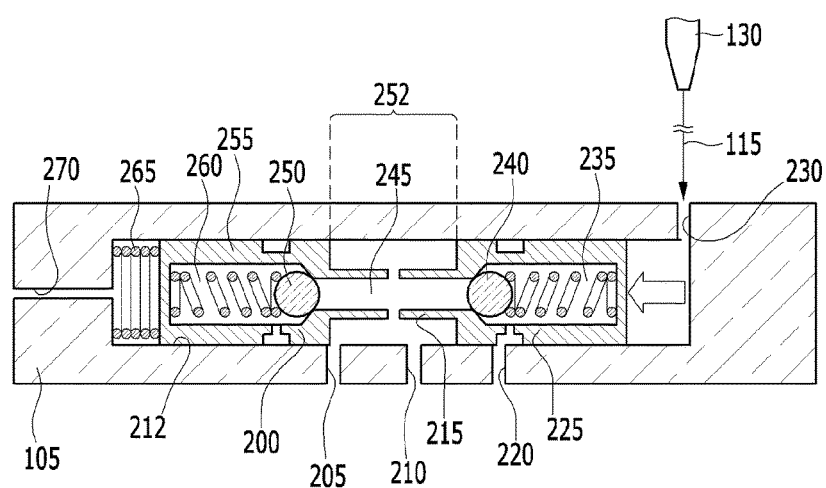
FIG. 3A is a cross-sectional view showing a state of a piston pin in a low compression ratio state in a variable compression ratio device according to one form of the present disclosure.

FIG. 3A is a cross-sectional view showing a state of a piston pin in a low compression ratio state in a variable compression ratio device according to one form of the present disclosure.

Referring to FIG. 3A, if the control unit 190 controls the oil jet control valve 125 such that the oil pumped by the hydraulic pump is injected by the oil jet injection nozzle 130, the injected oil reaches into the pocket 120 of the piston 100 and is supplied to the second end part of the plunger space 212 through the guide path 115 connected with the pocket 120 and the oil jet path 230 of the piston pin 105.

The plunger 255 is moved in the first end part direction (a left side) by the oil injected by the oil jet injection nozzle 130, and the second check path 225 connects to the second chamber connection path 220.

In one form of the present disclosure, the hydraulic pressure supplied through the main supply path 210 is supplied to the second chamber 157 through the open path 215, the check space connection path 245, the second check valve 240, the second check path 225, and the second chamber connection path 220.

In addition, the hydraulic pressure of the first chamber 155 is returned to the second chamber 157 through the first chamber connection path 205, the open path 215, the second check valve 240, the second check path 225, and the second chamber connection path 220.

Figure 3B:
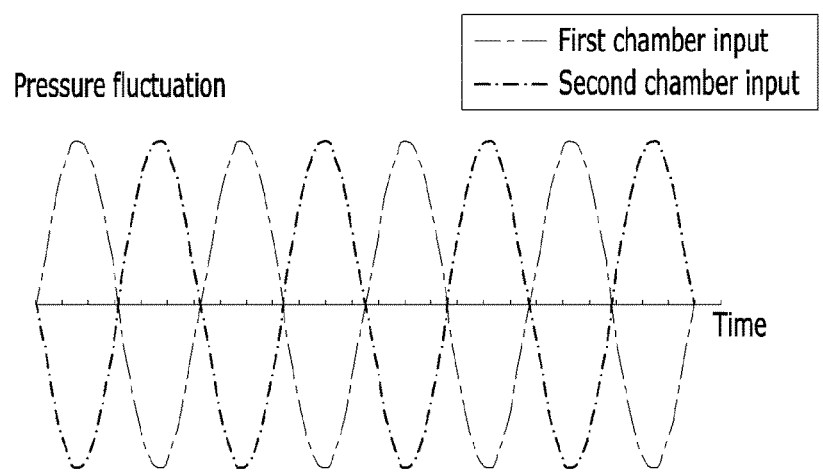
FIG. 3B is a graph showing a pressure fluctuation of a first chamber and a second chamber in a variable compression ratio device according to one form of the present disclosure.
Figure 3C:
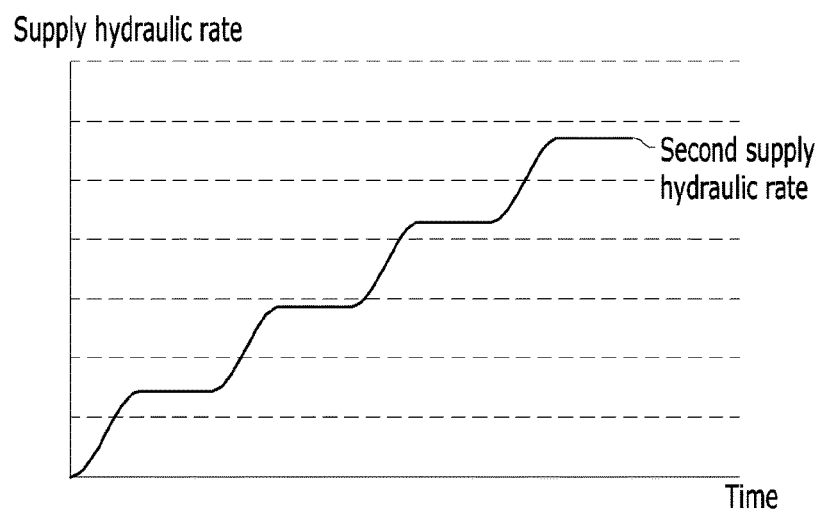
FIG. 3C is a graph showing a fluctuation of an oil supplied to a second chamber in a variable compression ratio device according to one form of the present disclosure.

FIGS. 3B and FIG. 3C are graphs showing a pressure fluctuation of a first chamber and a second chamber and a fluctuation of an oil supplied to a second chamber in a variable compression ratio device according to one form of the present disclosure.

Referring to FIG. 3B, the pressure of the first chamber 155 and the second chamber 157 are respectively fluctuated as the piston 100 performs intake, compress, explosion, and exhaust strokes. In the state that the pressure of the first chamber 155 is higher than the pressure of the second chamber 157, the oil of the first chamber 155 is moved to the second chamber 157.

Also, referring to FIG. 3C, the hydraulic rate supplied to the second chamber 157 is gradually increased by the pressure fluctuation of the first chamber 155 and the second chamber 157. Here, the movement from the second chamber 157 to the first chamber 155 is restricted by the second check valve 240.

Figure 4A:
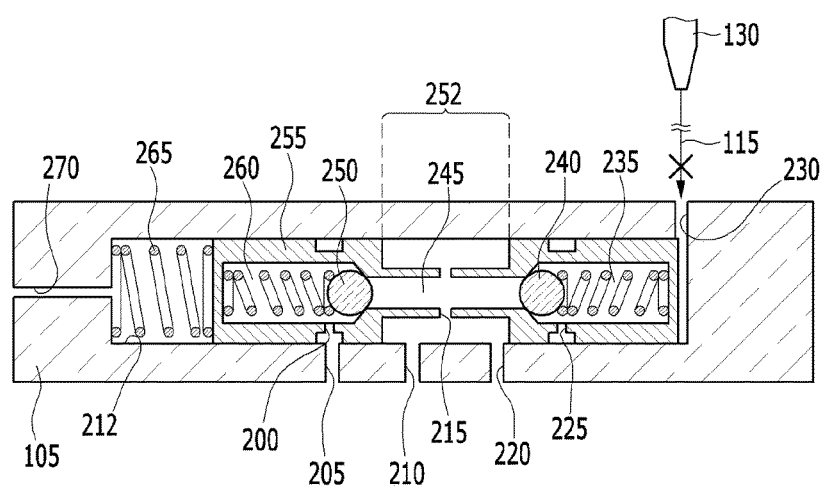
FIG. 4A is a cross-sectional view showing a state of a piston pin in a high compression ratio state in a variable compression ratio device according to one form of the present disclosure.

FIG. 4A is a cross-sectional view showing a state of a piston pin in a high compression ratio state in a variable compression ratio device according to one form of the present disclosure.

Referring to FIG. 4A, the control unit 190 controls the oil jet control valve 125 such that the oil pumped by the hydraulic pump is not injected by the oil jet injection nozzle 130.

Thus, the plunger 255 is moved by the return member 265 to the second end part direction (the right side), and the first check path 200 connects to the first chamber connection path 205.

In one form of the present disclosure, the hydraulic pressure supplied through the main supply path 210 is supplied to the first chamber 155 through the open path 215, the check space connection path 245, the first check valve 250, the first check path 200, and the first chamber connection path 205.

In addition, the hydraulic pressure of the second chamber 157 is returned to the first chamber 155 through the second chamber connection path 220, the open path 215, the first check valve 250, the first check path 200, and the first chamber connection path 205.

Figure 4B:
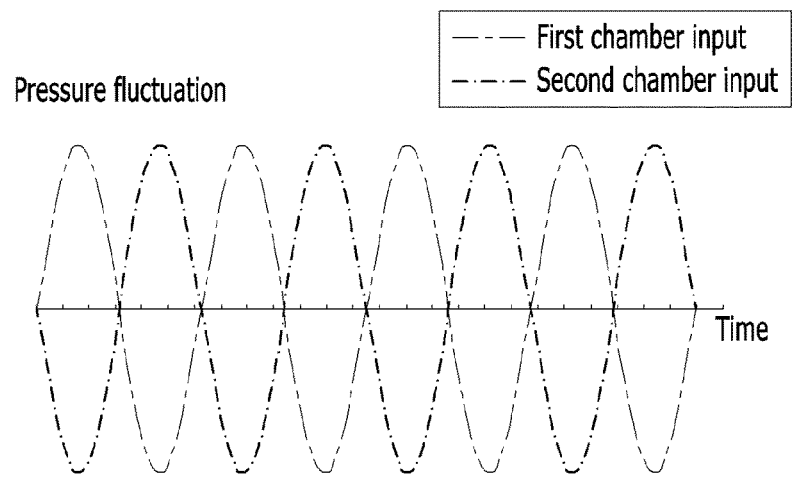
FIG. 4B is a graph showing a pressure fluctuation of a first chamber and a second chamber in a variable compression ratio device according to one form of the present disclosure.
Figure 4C:
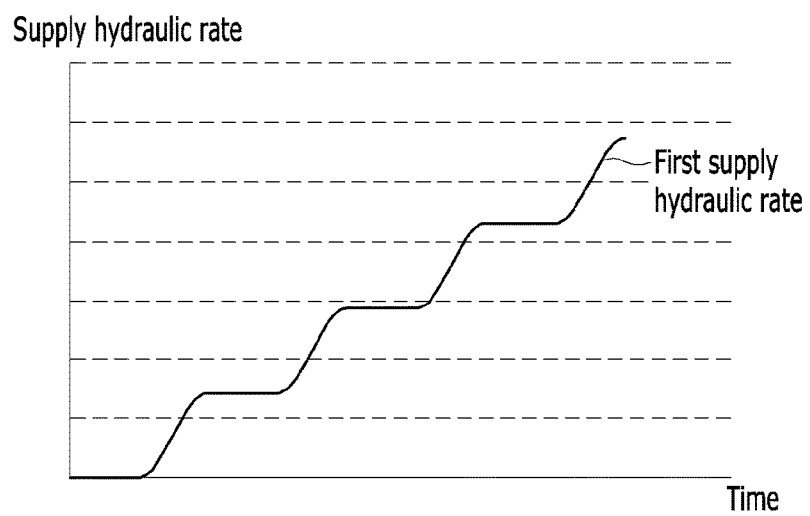
FIG. 4C is a graph showing a fluctuation of an oil supplied to a first chamber in a variable compression ratio device according to one form of the present disclosure.

FIGS. 4B and FIG. 4C are graphs showing a pressure fluctuation of a first chamber and a second chamber and a fluctuation of an oil supplied to a first chamber in a variable compression ratio device according to one form of the present disclosure.

Referring to FIG. 4B, the pressure of the first chamber 155 and the second chamber 157 is respectively fluctuated as the piston 100 performs the intake, compress, explosion, and exhaust strokes. In the state that the pressure of the second chamber 157 is higher than the pressure of the first chamber 155, the oil of the second chamber 157 is moved to the first chamber 155.

Also, referring to FIG. 4C, the hydraulic rate supplied to the first chamber 155 is gradually increased by the pressure fluctuation of the first chamber 155 and the second chamber 157. Here, the movement from the first chamber 155 to the first chamber 155 is restricted by the first check valve 250.

As described above, by controlling the movement of the plunger 255 by using the oil jet injected from the oil jet injection nozzle 130 disposed under the piston 100, the separate control path may be omitted such that the entire structure may be improved.

Particularly, one path supplied to the first chamber 155 and the second chamber 157 is only formed in the connecting rod 145 and the plunger 255 is directly moved by using the oil jet injected from the oil jet injection nozzle 130 cooling the lower part of the piston 100 such that a speed and an accuracy of the control may be improved.

Accordingly, by controlling the movement of the plunger by using the oil jet injected from the oil jet injection nozzle disposed under the piston, the separate control path may be omitted.

Particularly, one path supplied to the first chamber and the second chamber is only formed in the connecting rod and the plunger is directly moved by using the oil jet injected from the oil jet injection nozzle cooling the lower part of the piston such that the speed and the accuracy of the control may be improved.

While this disclosure has been described in connection with what is presently considered to be practical forms, it is to be understood that the disclosure is not limited to the disclosed forms. On the contrary, it is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A variable compression ratio device comprising:
   a connecting rod having a first end part connected with a piston and a second end part connected with a crankshaft;
   the piston connected to the connecting rod by a piston pin, the piston pin formed with a plunger space in a longitudinal direction therein;
   an eccentric cam disposed between an exterior circumference of the piston pin and an interior circumference of the connecting rod and forming a groove between the piston pin and the connecting rod;
   a stopper disposed inside the groove and fixed to one of the interior circumference of the connecting rod and the eccentric cam to divide the groove into a first chamber and a second chamber;
   a plunger disposed to be reciprocally moved in the plunger space to selectively supply a hydraulic pressure through the connecting rod to one of the first chamber and the second chamber;
   a return member disposed at a first end of the plunger space and supporting the plunger in a second end of the plunger space to supply the hydraulic pressure through the connecting rod to the second chamber; and
   an oil jet injection nozzle disposed under the piston to selectively inject oil to a piston side,
   wherein the oil injected from the oil jet injection nozzle is transmitted to the second end of the plunger space through a guide path formed inside the piston and an oil jet path formed in the piston pin such that the plunger is moved toward the first end of the plunger space and the hydraulic pressure through the connecting rod is supplied to the first chamber.

2. The variable compression ratio device of claim 1, wherein:
   if the oil is not injected from the oil jet injection nozzle, the plunger is moved by the return member toward the second end of the plunger space, and the hydraulic pressure supplied through the connecting rod is supplied to the second chamber.

3. The variable compression ratio device of claim 2, wherein:
   if the hydraulic pressure is supplied to the first chamber, a rotation position of the eccentric cam is controlled such that the piston is farther from the crankshaft, thereby realizing a high compression ratio.

4. The variable compression ratio device of claim 2, wherein:
   if the hydraulic pressure is supplied to the second chamber, a rotation position of the eccentric cam is controlled such that the piston is closer to the crankshaft, thereby realizing a low compression ratio.

5. The variable compression ratio device of claim 2, wherein:
- a first check space is formed inside a first end of the plunger, a second check space is formed inside a second end of the plunger,
- a check space connection path connecting the first check space and the second check space is formed inside the plunger,
- an exterior circumference of the plunger at the first end and second end of the plunger is in contact with an interior circumference of the plunger space,
- a smaller diameter part is formed at a center of a longitudinal direction of the plunger with the connection path spaced apart from the interior circumference of the plunger space by a predetermined interval,
- an open path leading from the check space connection path to outside of the smaller diameter part of the plunger,
- a first check path leading from the first check space to outside of the plunger is formed in the plunger, and a second check path leading from the second check space to outside of the plunger is formed in the plunger,
- a space formed by the smaller diameter part is always fluidly connected with a main supply path formed through the plunger for receiving a hydraulic pressure from the connecting rod,
- in a state that the plunger is moved toward the second end of the plunger space by the return member, a first chamber connection path formed through the piston pin from the interior circumference of the plunger space to outside of the piston pin connects the first check path with the first chamber,
- in a state that the plunger is moved toward the first end of the plunger space by the hydraulic pressure injected from the oil jet injection nozzle, a second chamber connection path formed through the piston pin from the interior circumference of the plunger space to outside of the piston pin connects the second check path with the second chamber.

6. The variable compression ratio device of claim 5, further comprising:
- a first check valve disposed at the first check space and preventing the hydraulic pressure from being transmitted from the first check space to the check space connection path; and
- a second check valve disposed at the second check space and preventing the hydraulic pressure from being transmitted from the second check space to the check space connection path.

7. The variable compression ratio device of claim 2, wherein:
- a vent hole extends through the piston pin from a first end of the plunger space near the return member to outside of the piston pin to reduce the inner hydraulic pressure.

8. The variable compression ratio device of claim 2, further comprising:
- a crank pin connecting the crankshaft and the connecting rod, and a hydraulic pump transmitting the hydraulic pressure to a main supply path through the connecting rod.

9. The variable compression ratio device of claim 6, wherein:
- the first and second check valves include a ball and an elastic member supporting the ball.

10. The variable compression ratio device of claim 2, wherein:
- an oil jet control valve controls the oil injected from the oil jet injection nozzle; and
- a control unit controls the oil jet control valve depending on an operation condition.

11. The variable compression ratio device of claim 2, wherein:
- a pocket is formed at a lower edge of the piston to receive the oil jet injected from the oil jet injection nozzle, and the hydraulic pressure is transmitted to the guide path through the pocket.

* * * * *